(12) United States Patent
Huang (10) Patent No.: US 11,858,470 B2
(45) Date of Patent: Jan. 2, 2024

(54) CARRIER

(71) Applicant: YOTTA INNOVATION CO., LTD., Apia (WS)

(72) Inventor: Stella Huang, Taipei (TW)

(73) Assignee: YOTTA INNOVATION CO., LTD., Apia (WS)

(*) Notice: Subject to any disclaimer, the term of this patent is extended or adjusted under 35 U.S.C. 154(b) by 0 days.

(21) Appl. No.: 17/737,728

(22) Filed: May 5, 2022

(65) Prior Publication Data

US 2023/0356665 A1 Nov. 9, 2023

(51) Int. Cl.
*B60R 9/06* (2006.01)
*B60R 9/10* (2006.01)

(52) U.S. Cl.
CPC . *B60R 9/06* (2013.01); *B60R 9/10* (2013.01)

(58) Field of Classification Search
CPC .................................. B60R 9/06; B60R 9/10
USPC ......................................................... 224/282
See application file for complete search history.

(56) References Cited

U.S. PATENT DOCUMENTS

| | | | | |
|---|---|---|---|---|
| 5,303,857 A * | 4/1994 | Hewson | ..................... | B60R 9/06 224/520 |
| 5,373,978 A * | 12/1994 | Buttchen | ................... | B60R 9/06 224/532 |
| 5,427,286 A * | 6/1995 | Hagerty | ..................... | B60R 9/00 224/570 |
| 5,529,231 A * | 6/1996 | Burgess | ..................... | B60R 9/10 248/592 |
| 5,685,469 A * | 11/1997 | Stapleton | .................. | B60R 9/10 224/536 |
| 5,845,831 A * | 12/1998 | Nusbaum | .................. | B60R 9/06 224/535 |
| 5,931,362 A * | 8/1999 | Chimenti | .................. | B60R 9/06 224/430 |
| 5,950,892 A * | 9/1999 | Tsai | .......................... | B60R 9/10 224/520 |
| 6,129,371 A * | 10/2000 | Powell | ....................... | B60R 9/06 280/491.5 |
| 6,286,738 B1 * | 9/2001 | Robins | ....................... | B60R 9/10 224/532 |
| 6,443,345 B1 * | 9/2002 | Bloemer | ................... | B60R 9/06 224/532 |
| 6,547,116 B2 * | 4/2003 | Anderson | ................. | B60R 9/10 224/536 |

(Continued)

*Primary Examiner* — Peter N Helvey
(74) *Attorney, Agent, or Firm* — Muncy, Geissler, Olds & Lowe, P.C.

(57) ABSTRACT

A carrier is provided, including: a mounting rod including an inclined surface; a frame body, including a connecting seat which includes an upper plate connected to the two side plates and two side plates rotatably connected to the mounting rod, a stand rod and two lateral rods, the stand rod and the two lateral rods being connected to the connecting seat, wherein when located in a first position, the connecting seat is parallel to the mounting rod, and when the connecting seat is located in a second position, the inclined surface is abutted against the upper plate; a first pin, wherein when the connecting seat is located in the first position, the first pin is inserted in the mounting rod and at least one of the two side plates so that the connecting seat is positioned in the first position and non-rotatable toward the second position.

9 Claims, 12 Drawing Sheets

(56) References Cited

U.S. PATENT DOCUMENTS

| | | | | |
|---|---|---|---|---|
| 6,644,525 B1* | 11/2003 | Allen | ................... | B60R 9/06 224/532 |
| 6,918,520 B2* | 7/2005 | Skinner | ................... | B62D 43/02 224/42.21 |
| 6,929,163 B1* | 8/2005 | Pedrini | ................... | B60R 9/10 224/521 |
| 7,261,229 B1* | 8/2007 | Allen | ................... | B60R 9/10 224/495 |
| D672,704 S * | 12/2012 | Grago | ................... | D12/408 |
| 8,640,888 B2* | 2/2014 | Liu | ................... | B60R 9/10 224/501 |
| 9,802,549 B1* | 10/2017 | Shen | ................... | B60R 9/10 |
| 10,183,627 B1* | 1/2019 | Liu | ................... | B60R 9/06 |
| 10,384,618 B2* | 8/2019 | Williams | ................... | B60R 9/10 |
| 10,906,473 B1* | 2/2021 | Yu | ................... | B60R 9/06 |
| 11,148,607 B1* | 10/2021 | Hsieh | ................... | B60R 9/045 |
| D946,490 S * | 3/2022 | Li | ................... | D12/408 |
| D952,539 S * | 5/2022 | Shen | ................... | D12/407 |
| D955,970 S * | 6/2022 | Shen | ................... | D12/407 |
| 11,383,779 B1* | 7/2022 | Huang | ................... | B62H 3/00 |
| D964,254 S * | 9/2022 | Huang | ................... | D12/407 |
| 11,465,702 B2* | 10/2022 | Williams | ................... | B25H 3/04 |
| 11,472,502 B1* | 10/2022 | Huang | ................... | B60R 9/06 |
| 11,511,677 B2* | 11/2022 | Peng | ................... | B60R 9/10 |
| 11,584,306 B1* | 2/2023 | Wallin | ................... | B60R 9/10 |
| 2005/0061842 A1* | 3/2005 | Tsai | ................... | B60R 9/06 224/501 |
| 2005/0133555 A1* | 6/2005 | Bove | ................... | B60R 9/06 224/924 |
| 2008/0099522 A1* | 5/2008 | Clausen | ................... | B60R 9/06 224/519 |
| 2008/0230579 A1* | 9/2008 | Wang | ................... | B60R 9/10 224/400 |
| 2009/0120984 A1* | 5/2009 | Sautter | ................... | B60R 9/10 224/532 |
| 2010/0096424 A1* | 4/2010 | Kuschmeader | ................... | B60R 9/06 224/509 |
| 2010/0230455 A1* | 9/2010 | Wang | ................... | B60R 9/06 224/533 |
| 2010/0320247 A1* | 12/2010 | Wang | ................... | B60R 9/10 224/567 |
| 2011/0068140 A1* | 3/2011 | Stevens | ................... | B60R 9/10 224/533 |
| 2013/0062383 A1* | 3/2013 | Jeli | ................... | B60R 9/10 224/549 |
| 2013/0062385 A1* | 3/2013 | Pedrini | ................... | B60R 9/10 224/501 |
| 2013/0243518 A1* | 9/2013 | Wiedemann | ................... | F16B 7/044 403/205 |
| 2014/0027484 A1* | 1/2014 | Loken | ................... | B60R 9/06 224/521 |
| 2014/0151421 A1* | 6/2014 | Loken | ................... | B60R 9/06 224/519 |
| 2016/0068111 A1* | 3/2016 | Walker | ................... | B60R 9/10 224/521 |
| 2017/0253188 A1* | 9/2017 | Shen | ................... | B60R 9/10 |
| 2017/0349110 A1* | 12/2017 | Bass | ................... | B60R 9/10 |
| 2017/0349111 A1* | 12/2017 | Ramsdell | ................... | B60R 9/06 |
| 2018/0072237 A1* | 3/2018 | Kuschmeader | ................... | B60R 9/10 |
| 2018/0134229 A1* | 5/2018 | Shen | ................... | B60R 9/06 |
| 2018/0147997 A1* | 5/2018 | Woelfling | ................... | B60R 9/06 |
| 2018/0354427 A1* | 12/2018 | Yazdian | ................... | B60R 9/10 |
| 2019/0016271 A1* | 1/2019 | Garceau | ................... | B60R 9/06 |
| 2019/0161022 A1* | 5/2019 | McFadden | ................... | B60R 9/10 |
| 2020/0023787 A1* | 1/2020 | Prescott | ................... | B60R 9/10 |
| 2020/0031289 A1* | 1/2020 | Williams | ................... | B60R 9/045 |
| 2020/0086803 A1* | 3/2020 | Settelmayer | ................... | B60R 9/10 |
| 2020/0156724 A1* | 5/2020 | Kuschmeader | ................... | B62H 3/12 |
| 2020/0172185 A1* | 6/2020 | Hammond | ................... | B62H 3/12 |

\* cited by examiner

CARRIER

BACKGROUND OF THE INVENTION

Field of the Invention

The present invention relates to a carrier.

Description of the Prior Art

Nowadays, people like to engage in outdoor leisure activities for relaxing body and mind when they are on vacation. For example, it is popular to place bicycles on a carrier which is configured to be connected to a vehicle. The conventional carrier has a mounting rod and a main frame, and the mounting rod is configured to be connected to the vehicle. The main frame has a stand rod and a supporting rod for installing and positioning the bicycle. In order to open the rear door of the vehicle without dismantling the carrier, the main frame and the mounting rod of the carrier are rotatably and adjustably connected with each other, and a positioning mechanism is therefore provided to prevent the main frame body and mounting rod from unexpected relative rotation. However, the positioning mechanism of the conventional carrier is easy to disengage from positioning during the travel of the vehicle, which causes unstable relative movement of the main frame and the mounting rod resulting in falling of the bicycle.

The present invention is, therefore, arisen to obviate or at least mitigate the above-mentioned disadvantages.

SUMMARY OF THE INVENTION

The main object of the present invention is to provide a carrier which is stable and safe in use.

To achieve the above and other objects, the present invention provides a carrier is provided, including: a mounting rod, configured to be connected to a vehicle, a top of an end of the mounting rod remote from the vehicle including an inclined surface; a frame body, including a connecting seat, a stand rod and two lateral rods, the stand rod and the two lateral rods being connected to the connecting seat, the connecting seat including an upper plate and two side plates, the upper plate being connected to and between the two side plates, the two side plates being rotatably connected to the mounting rod by a shaft and rotatable between a first position and a second position, wherein when the connecting seat is located in the first position, the connecting seat and the mounting rod are parallel to each other, and when the connecting seat is located in the second position, the inclined surface is abutted against the upper plate so that the connecting seat is positioned in the second position; a first pin, wherein when the connecting seat is located in the first position, the first pin is detachably inserted in the mounting rod and at least one of the two side plates so that the connecting seat is positioned in the first position and non-rotatable toward the second position.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 12 for a preferable embodiment of the present invention. A carrier of the present invention includes a mounting rod 1, a frame body 2 and a first pin 3.

The mounting rod 1 is configured to be connected to a vehicle 9, and a top of an end of the mounting rod 1 remote from the vehicle 9 includes an inclined surface 11.

The frame body 2 includes a connecting seat 21, a stand rod 22 and two lateral rods 23. The stand rod 22 and the two lateral rods 23 are connected to the connecting seat 21, and the connecting seat 21 includes an upper plate 211 and two side plates 212. The upper plate 211 is connected to and between the two side plates 212, and the two side plates 212 are rotatably connected to the mounting rod 1 by a shaft 24 and rotatable between a first position and a second position. When the connecting seat 21 is located in the first position, the connecting seat 21 and the mounting rod 1 are parallel to each other, and when the connecting seat 21 is located in the second position, the inclined surface 11 is abutted against the upper plate 211 so that the connecting seat 21 is positioned in the second position.

When the connecting seat 21 is located in the first position, the first pin 3 is detachably inserted in the mounting rod 1 and at least one the side plate 212 so that the connecting seat 21 is positioned in the first position and non-rotatable toward the second position.

Figure 1:
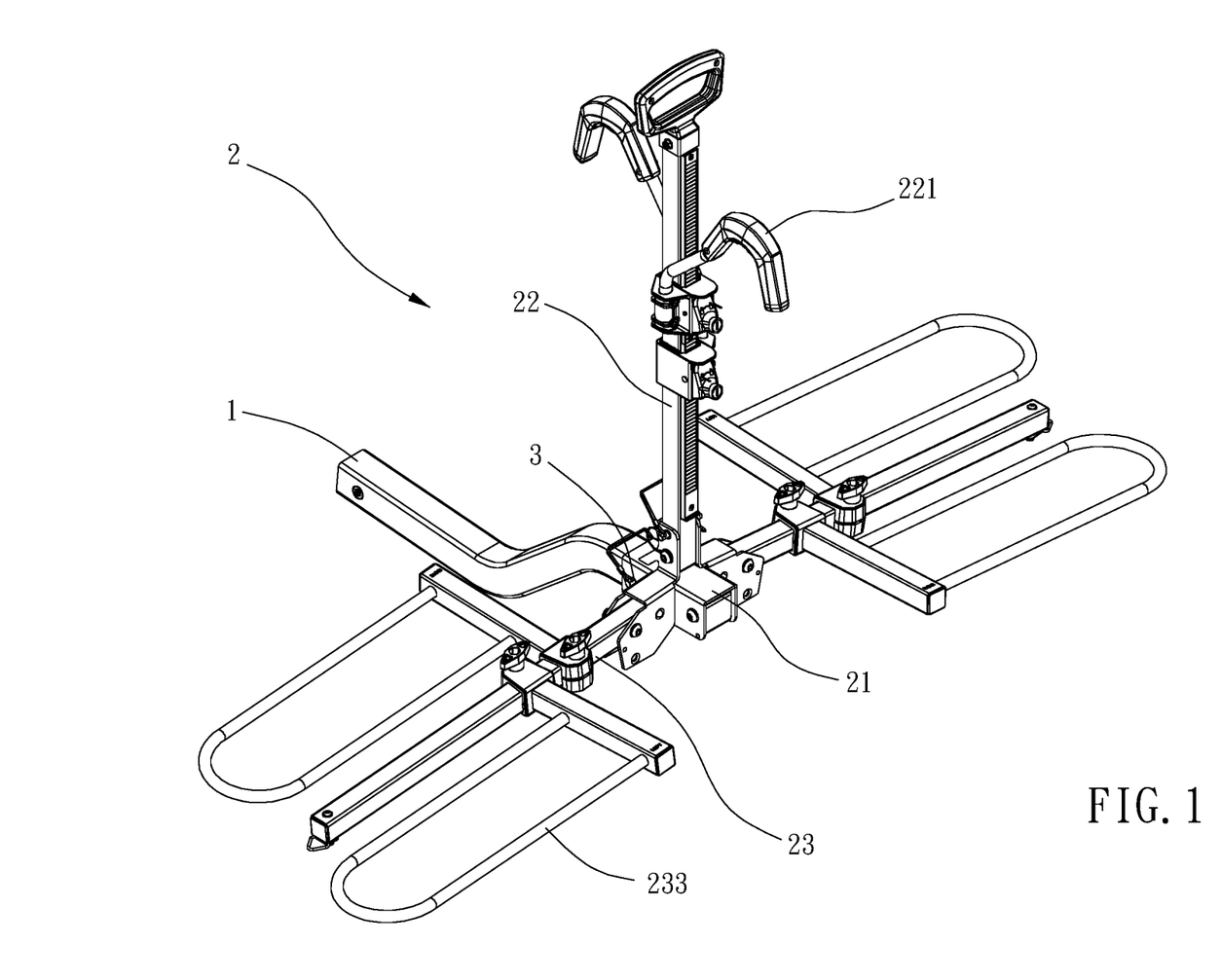
FIG. 1 is a stereogram of a preferable embodiment of the present invention.
Figure 2:
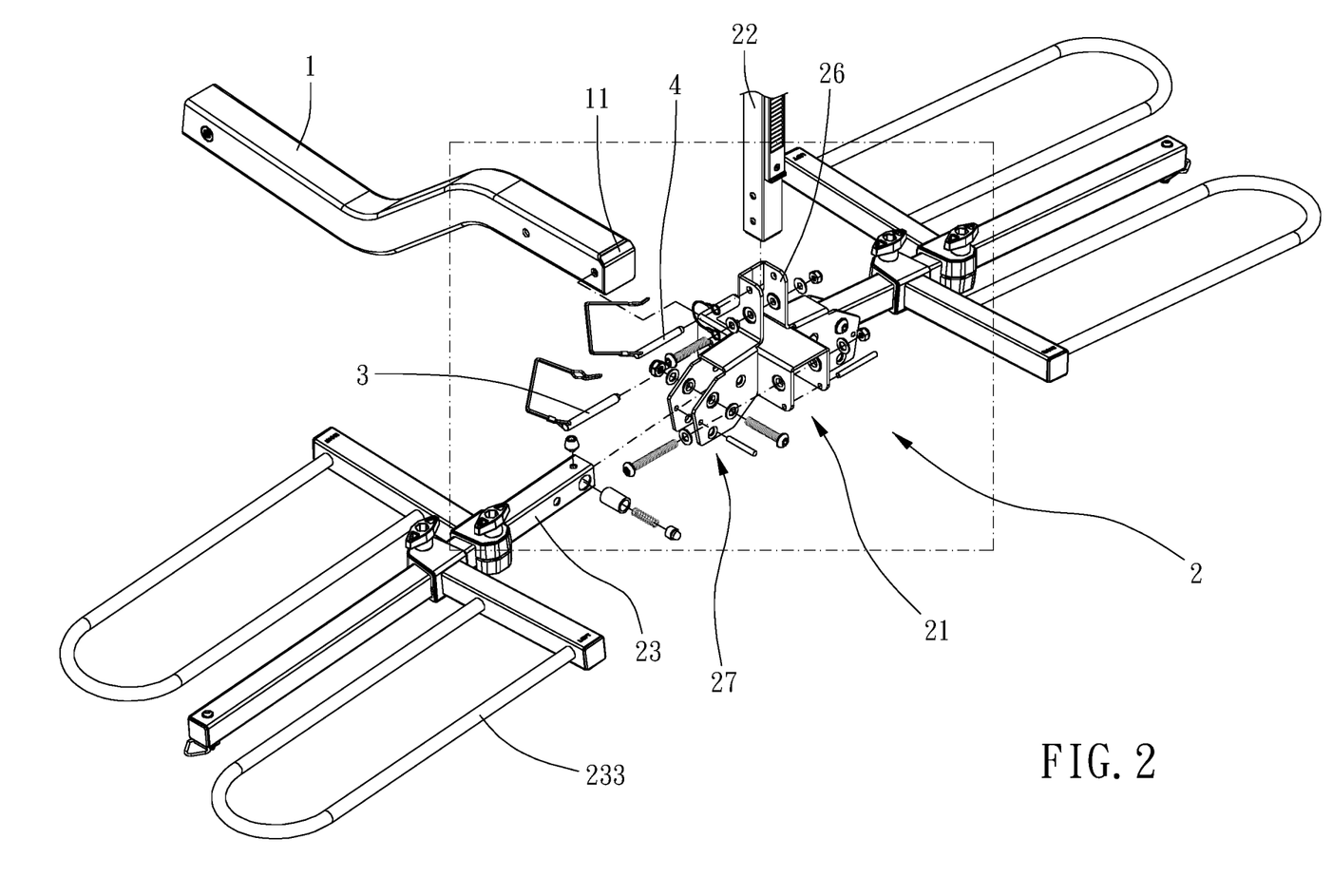
FIG. 2 is a breakdown drawing of a preferable embodiment of the present invention.
Figure 3:
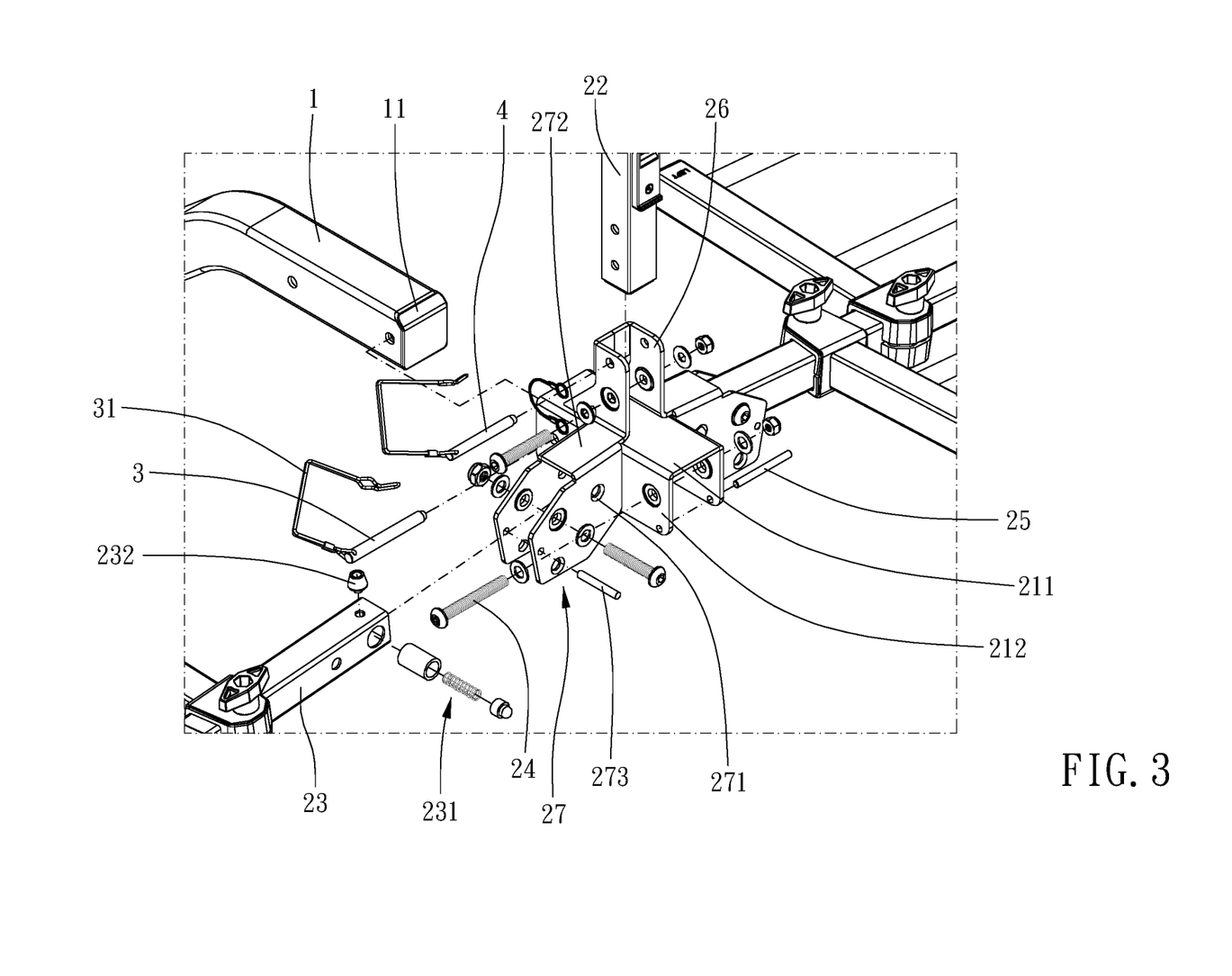
FIG. 3 is an enlargement of FIG. 2.
Figure 4:
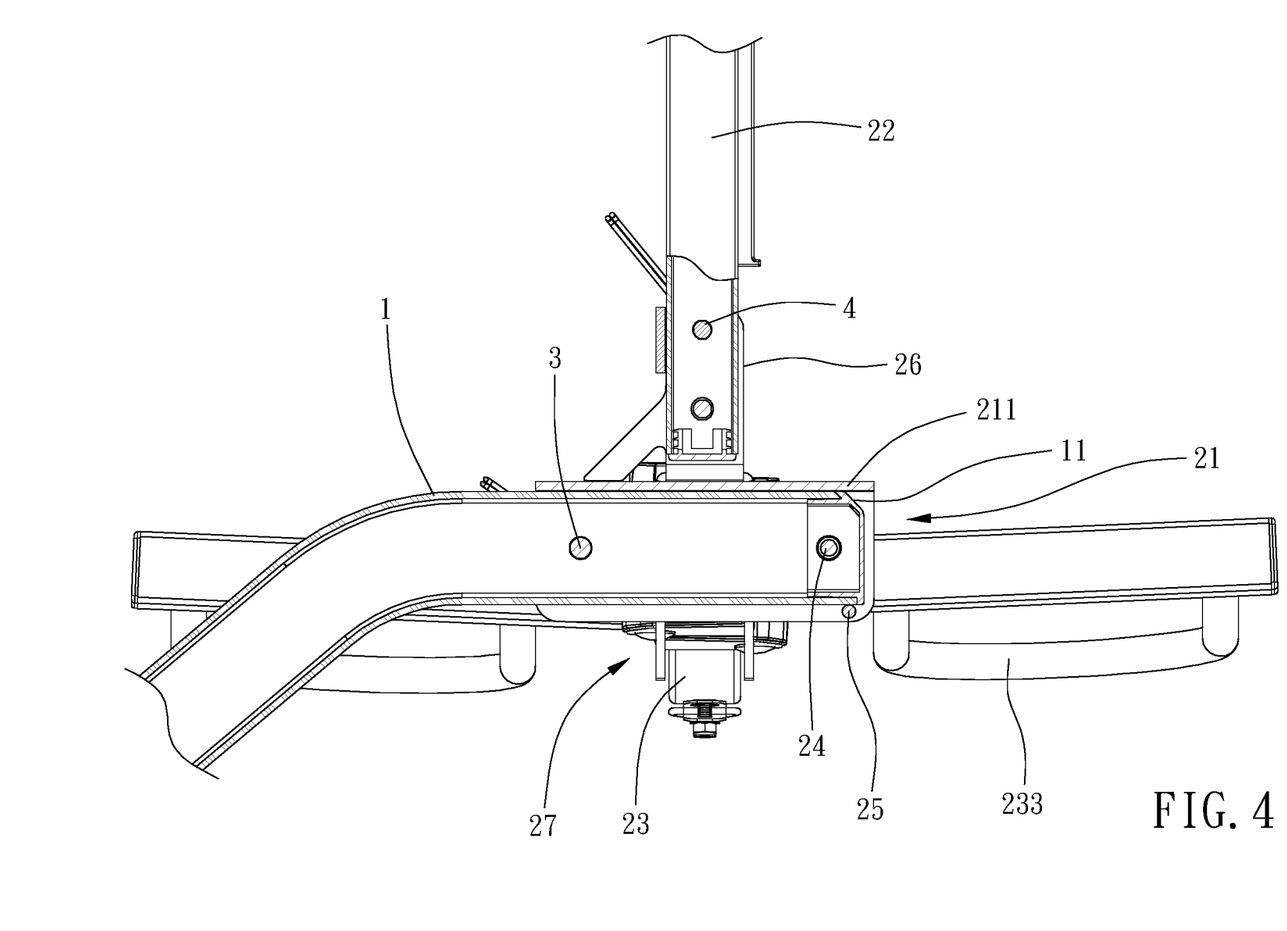
FIGS. 4 and 5 are drawings showing operation of a connecting seat according to a preferable embodiment of the present invention.
Figure 5:
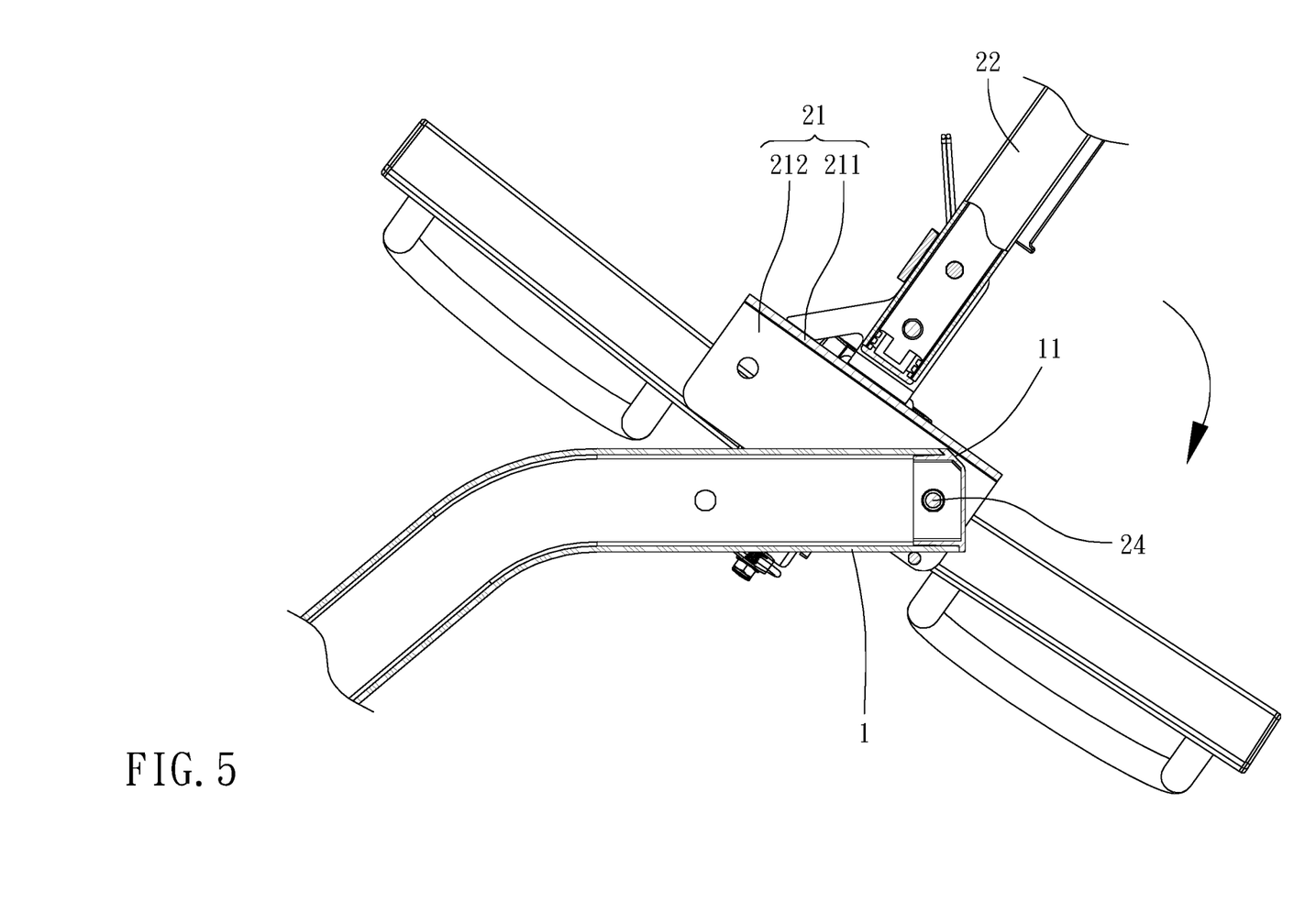
Figure 6:
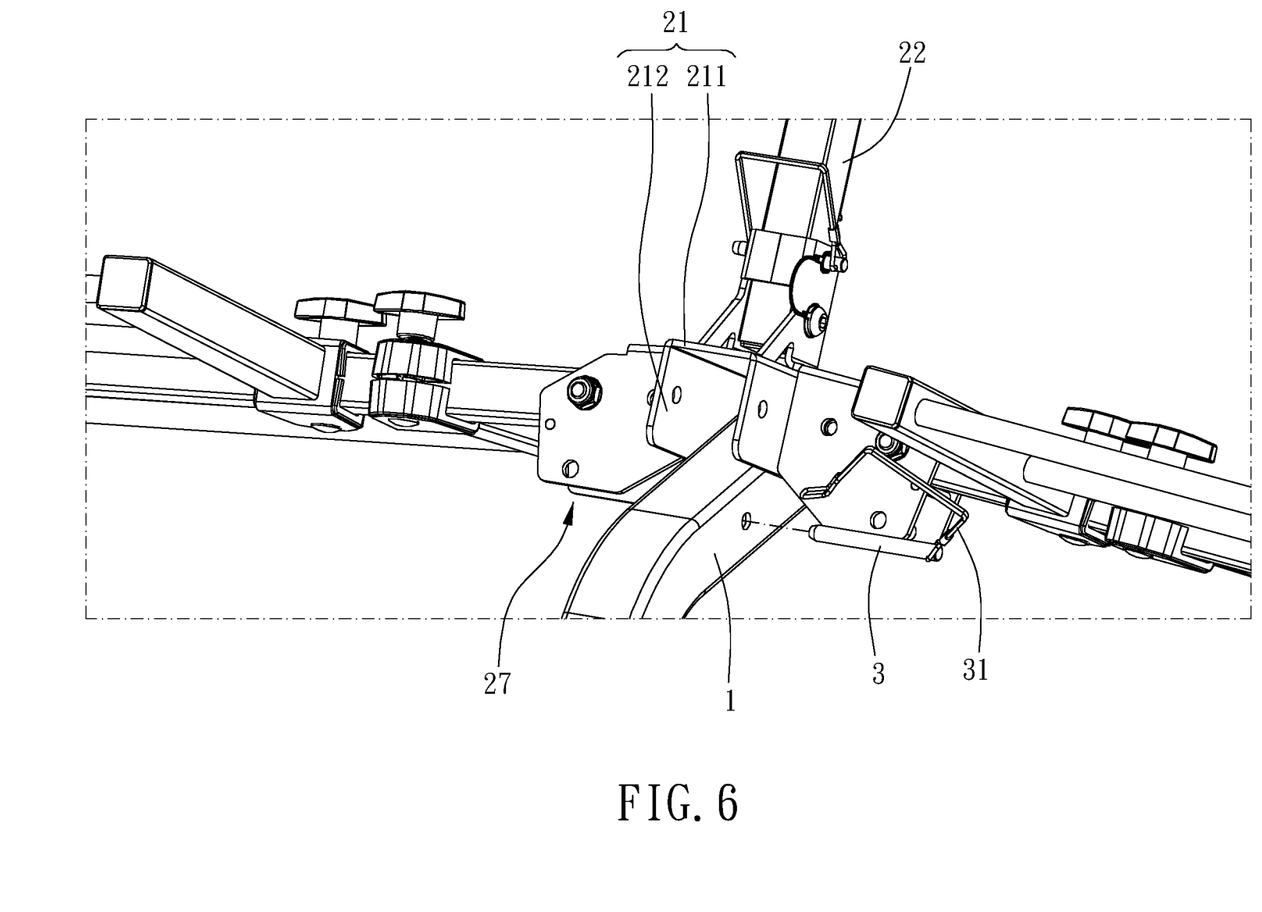
FIG. 6 is a partial stereogram of a preferable embodiment of the present invention.
Figure 7:
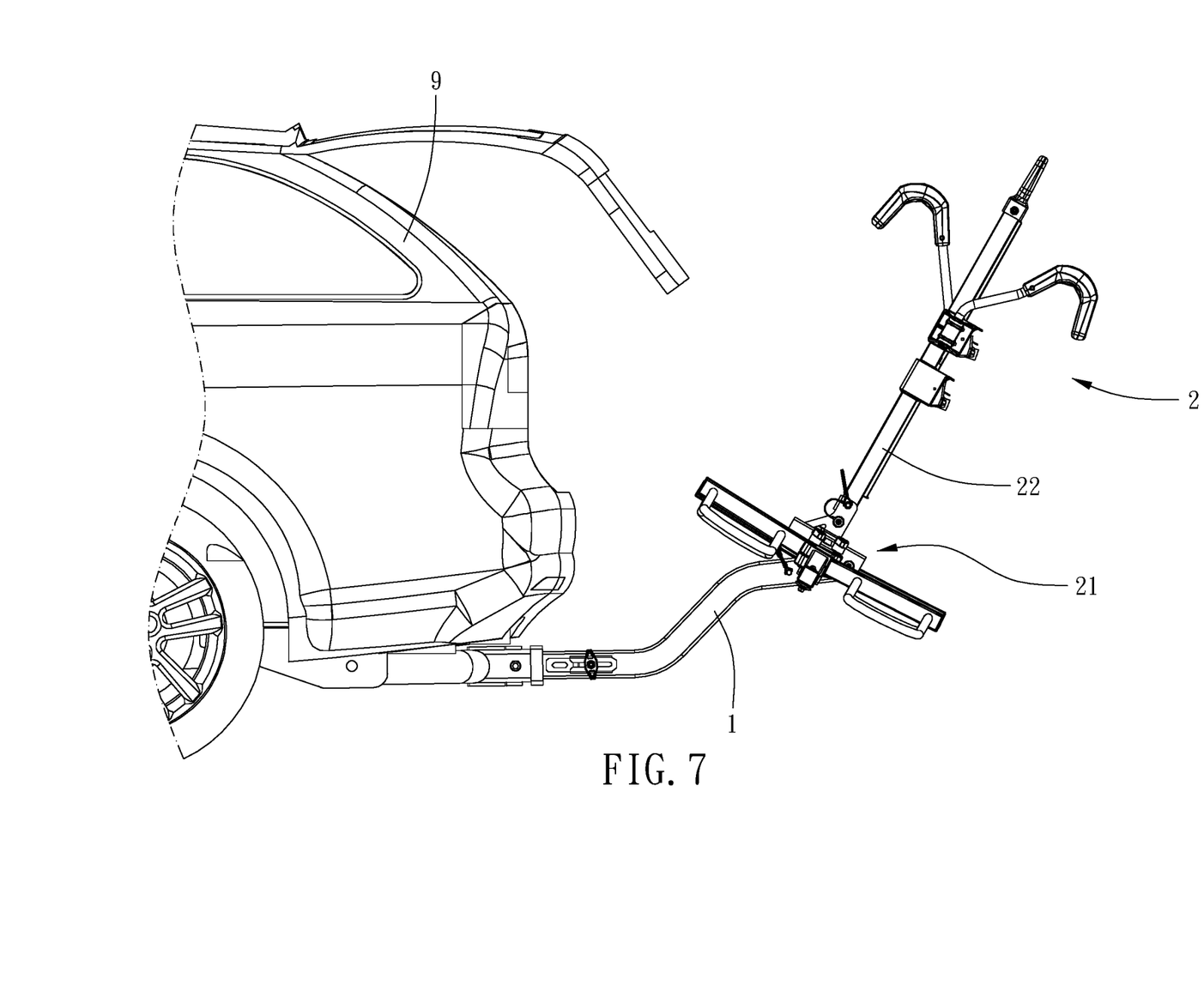
FIG. 7 is a drawing showing application of a preferable embodiment of the present invention.

When the connecting seat 21 is located in the first position and the first pin 3 is inserted in the mounting rod 1 and at least one the side plate 212 (in this embodiment, the first pin 3 is inserted in the two side plates 212 and the mounting rod 1), and thus the connecting seat 21 is stably positioned in the first position so that it is safe during moving of the vehicle 9 (FIG. 4). Before the rear door of the vehicle 9 is open, it is to withdraw the first pin 3 from the two side plates 212 and the mounting rod 1 so that the connecting seat 21 is not blocked by the first pin 3 and is rotatable toward the second position, and thus the rear door of the vehicle 9 is not blockable by the connecting seat 21 when opened (FIGS. 5-7).

The shaft 24 is located between the inclined surface 11 and the first pin 3, and when the connecting seat 21 is located in the first position, an included angle between the inclined surface 11 and the top of the mounting rod 1 is equal to or less than 70 degrees, which prevents the connecting seat 21 from overswinging for more than 70 degrees between the first position and the second position and prevents the stand rod 22 from being over inclined. Moreover, the inclined surface 11 can avoid interference to the connecting seat 21 during rotation of the connecting seat 21 from the first position toward the second position.

Preferably, a stop member 25 is inserted to the two side plates 212, the stop member 25 is located at ends of the two side plates 212 remote from the upper plate 211, and when the connecting seat 21 is located in the second position, the stop member 25 is abutted against a bottom of the mounting rod 1 so that it mitigates active force caused by abutment of the upper plate 211 and the inclined surface 11 when the connecting seat 21 is located in the second position.

Each of opposing sides of the stand rod 22 includes a retaining member 221, and each of the two lateral rods 23 includes two carrying members 233 each corresponding to one of the two retaining members 221. Each of the two retaining members 221 is configured for retaining a bicycle, and each of the carrying members 232 is configured for supporting a wheel of the bicycle. In this embodiment, the upper plate 211 includes an upright seat 26, the stand rod 22 is rotatably connected to the upright seat 26, the carrier further includes a second pin 4, and the second pin 4 is releasably inserted in the upright seat 26 and the stand rod 22 so that the stand rod 22 is non-rotatable relative to the upright seat 26.

Figure 8:
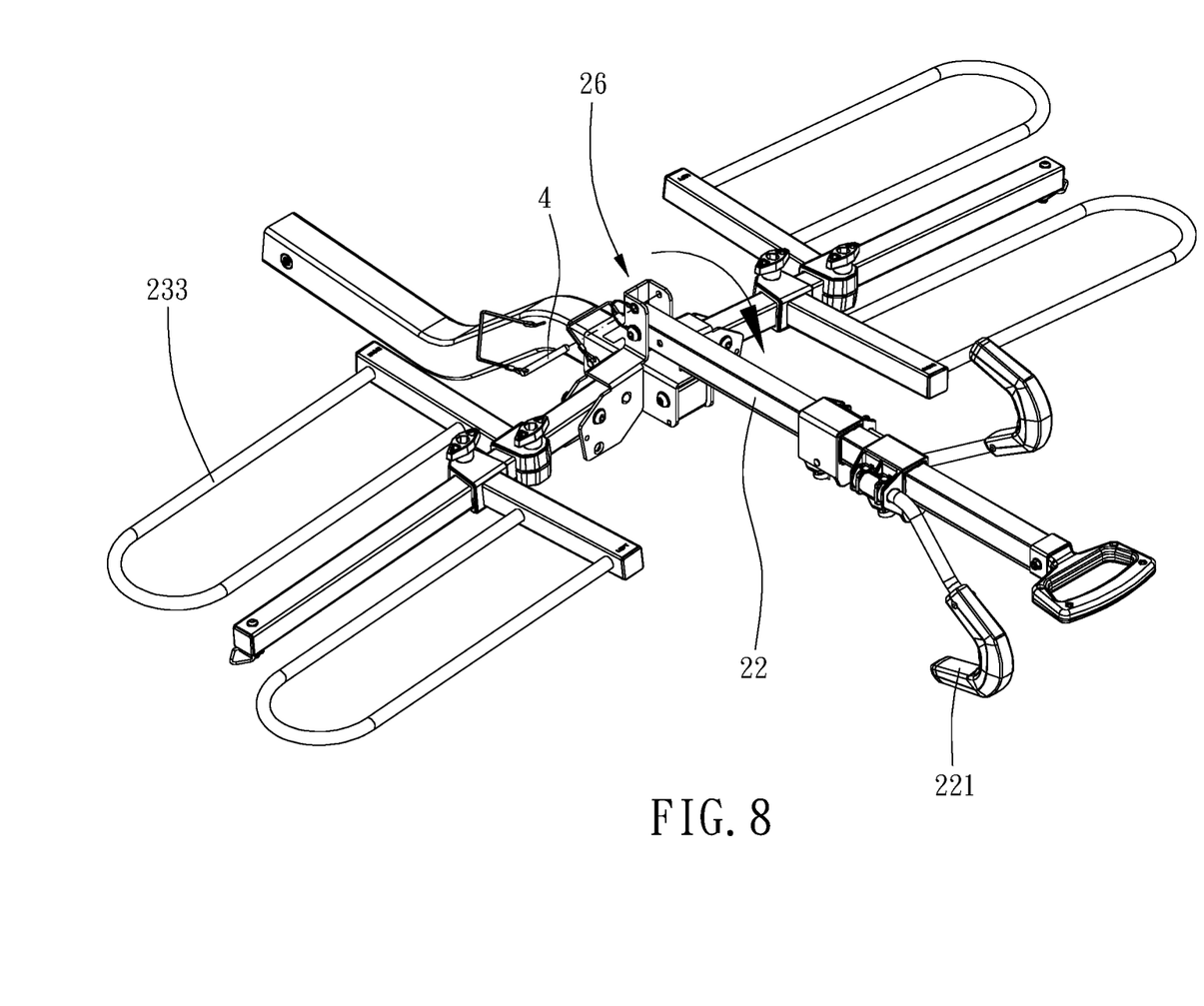
FIG. 8 is a drawing showing operation of a stand rod according to a preferable embodiment of the present invention.
Figure 9:
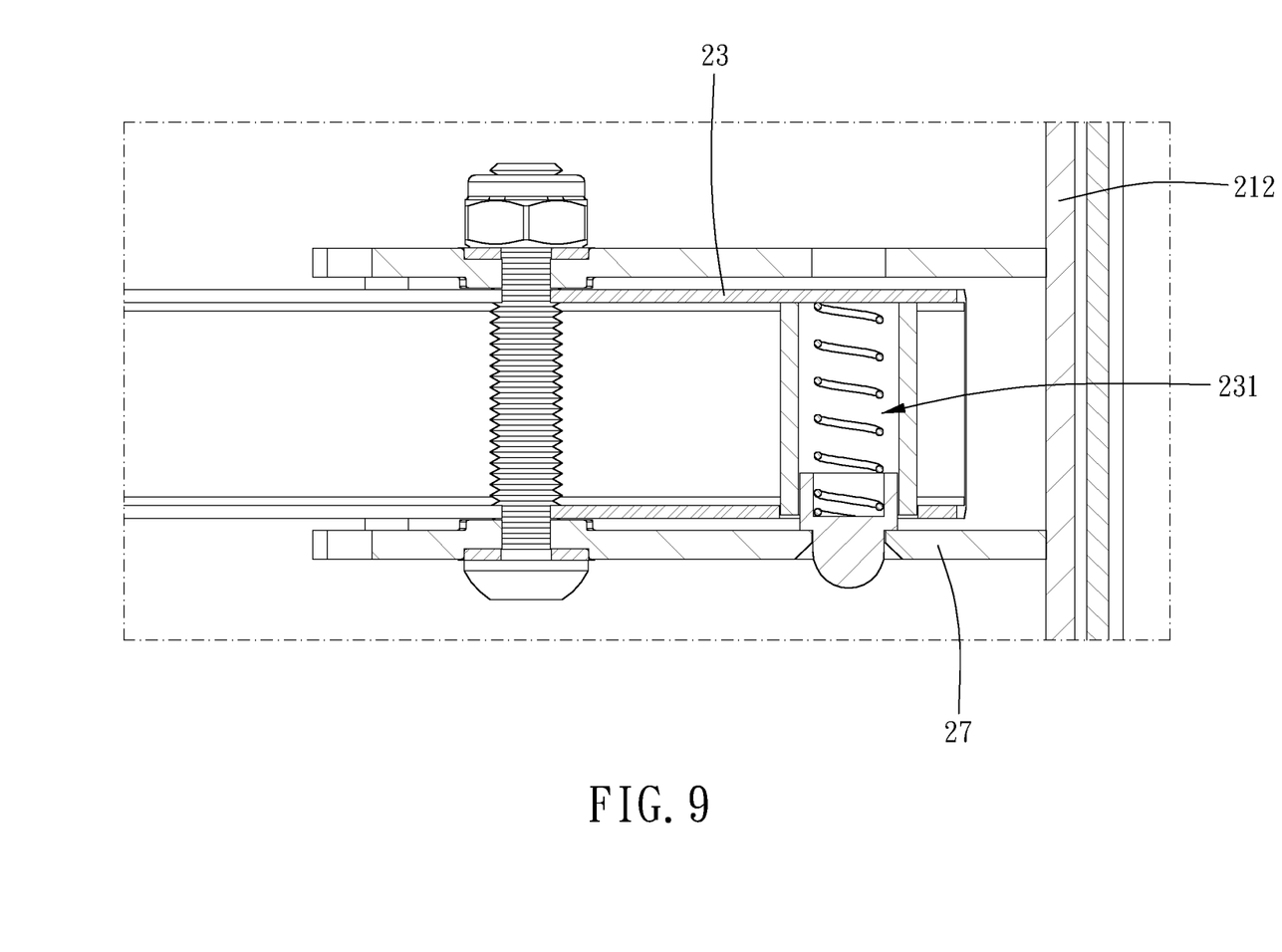
FIGS. 9 and 10 are drawings showing operation of an elastic positioning member according to a preferable embodiment of the present invention.
Figure 10:
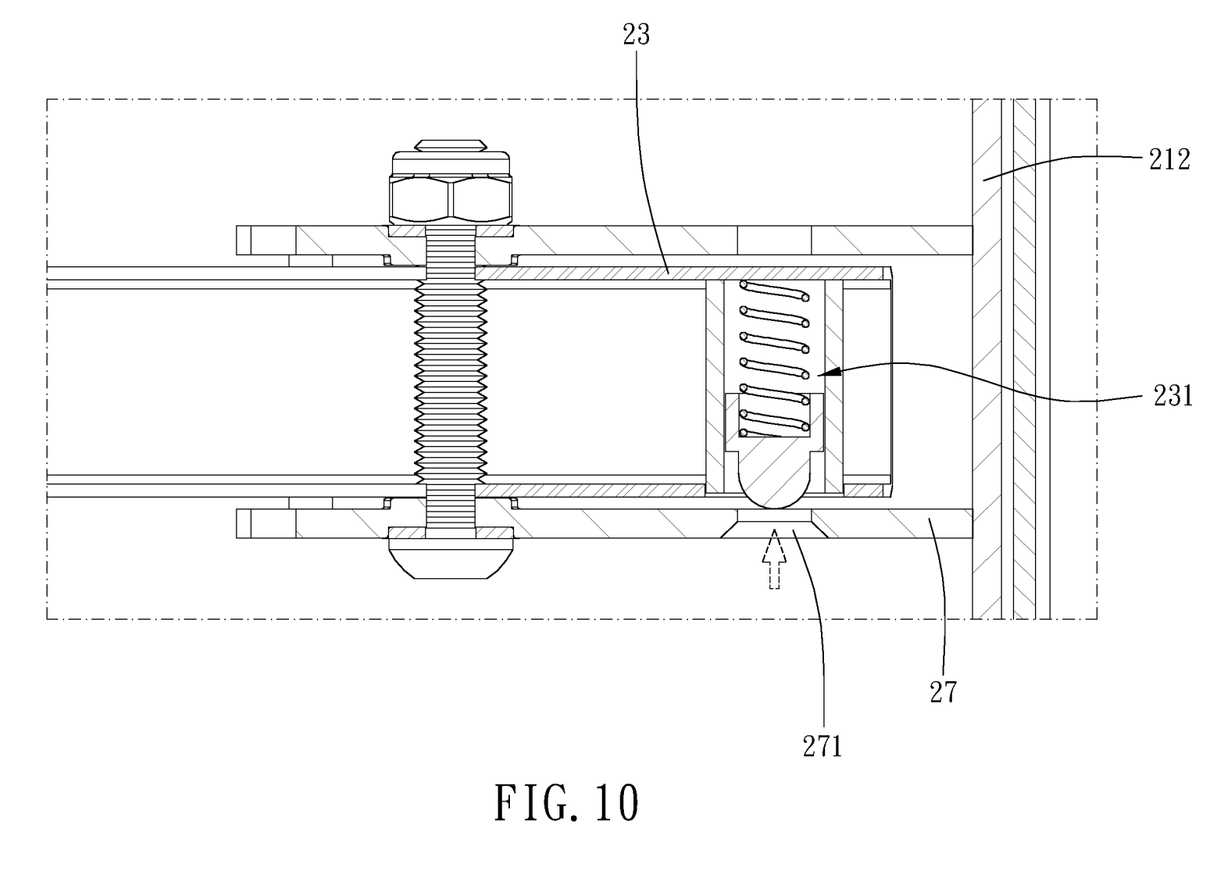
Figure 11:
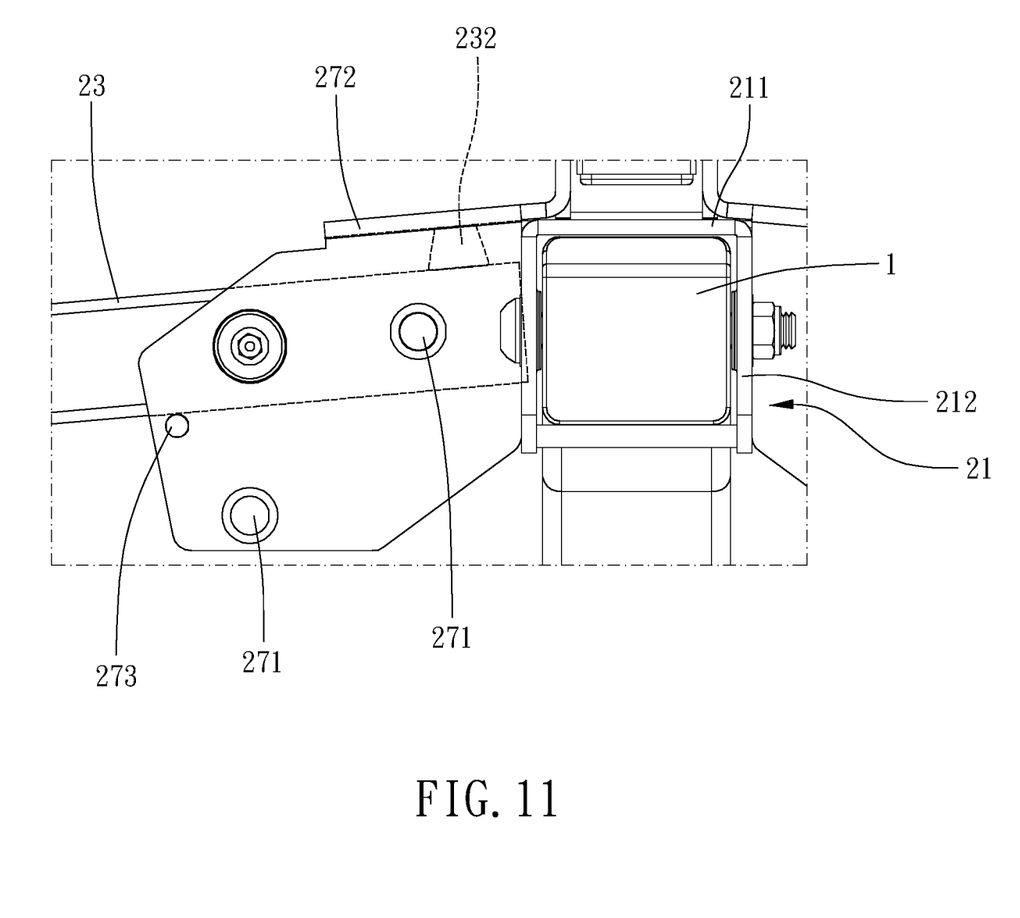
FIGS. 11 and 12 are drawings showing operation of a lateral rod according to a preferable embodiment of the present invention.
Figure 12:
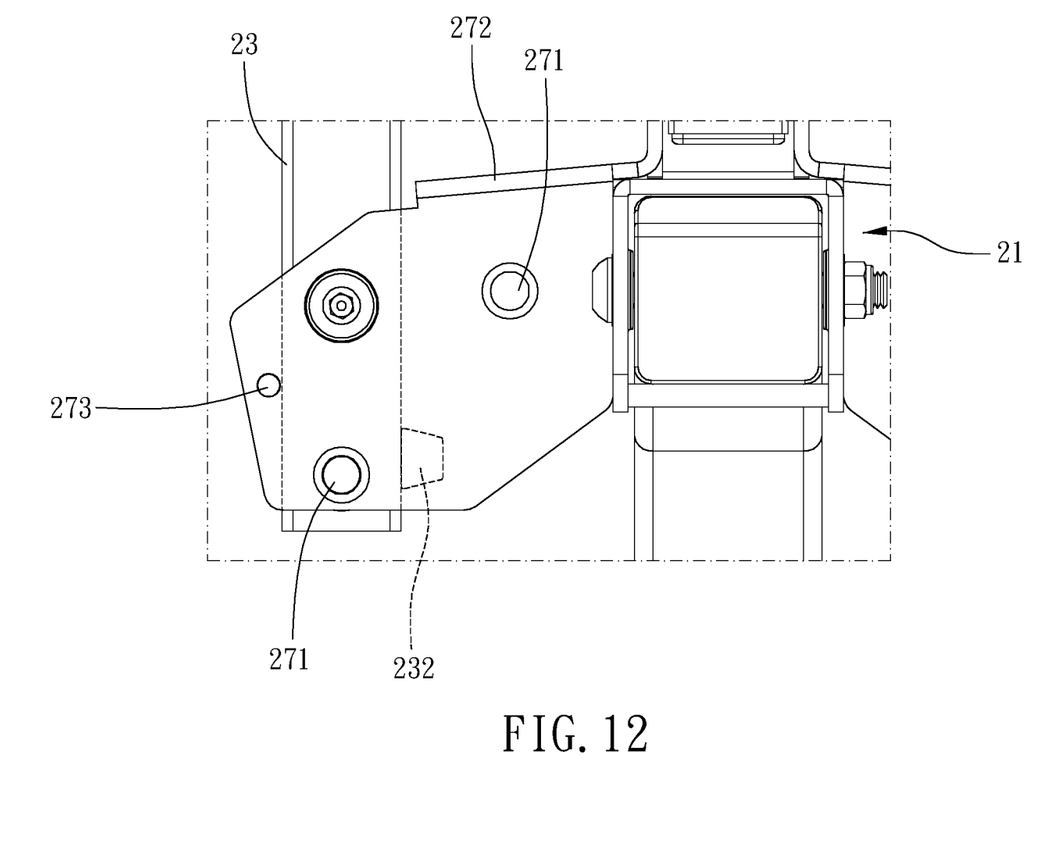

When the wheels of the bicycle is to be disposed on the two carrying members 232 toward the front of the vehicle 9, the second pin 4 may be released and the stand rod 22 is rotated away from the vehicle 9, for easy loading of the bicycle on the carrier (FIG. 8).

Please refer to FIGS. 9-12, two side seats 27 are connected to opposing sides of the connecting seat 21, respectively; the two lateral rods 23 are rotatably connected to the two side seats 27, respectively; a side of each of the two side seats 27 includes at least two positioning holes 271, and each of the two lateral rods 23 includes an elastic positioning member 231; and when the elastic positioning member 231 corresponds to and engages in one of the two positioning holes 271, the lateral rod 23 is non-rotatable relative to the side seat 27. Each of the two lateral rods 23 is unfolded (FIG. 11) or folded (FIG. 12) through interaction of the elastic positioning member 231 and the two positioning holes 271 of the side seat 27, for easy and quick operation.

Preferably, an upper portion of each of the two side seats 27 adjacent to the connecting seat 21 includes an upper blocking member 272, and a lower portion of each of the two side seats 27 remote from the connecting seat 21 includes a lower blocking member 273. A position at which the side seat 27 and the lateral rod 23 are rotatably connected is located between the upper blocking member 272 and the lower blocking member 273. When each of the two lateral rods 23 rotates downward, an end of each of the two lateral rods 23 directed toward the connecting seat 21 is abutted against the upper blocking member 272, and another end of each of the two lateral rods 23 is abutted against the lower blocking member 273, so that the two lateral rods 23 are positioned.

In this embodiment, the upper blocking member 272 is a plate member, the lower blocking member 273 is a pin member, a buffering member 232 is disposed on an end of the lateral rod 23 directed toward the connecting seat 21, and when the lateral rod 23 rotates downward, the buffering member 232 is abutted against the upper blocking member 272, which prevents damage to the carrier.

Preferably, an end of an elastic buckle member 31 is rotatably connected to the first pin 3, the elastic buckle member 31 extends cross the connecting seat 21, and another end of the elastic buckle member 31 is sleeved on the first pin 3, thus preventing unexpected disengagement of the first pin 3 from the two side plates 212 and the mounting rod 1.

Although particular embodiments of the invention have been described in detail for purposes of illustration, various modifications and enhancements may be made without departing from the spirit and scope of the invention. Accordingly, the invention is not to be limited except as by the appended claims.

What is claimed is:
1. A carrier, including:
   a mounting rod, configured to be connected to a vehicle, a top of an end of the mounting rod remote from the vehicle including an inclined surface;
   a frame body, including a connecting seat, a stand rod and two lateral rods, the stand rod and the two lateral rods being connected to the connecting seat, the connecting seat including an upper plate and two side plates, the upper plate being connected to and between the two side plates, the two side plates being rotatably connected to the mounting rod by a shaft and rotatable between a first position and a second position, wherein when the connecting seat is located in the first position, the connecting seat and the mounting rod are parallel to each other, and when the connecting seat is located in the second position, the inclined surface is abutted against the upper plate so that the connecting seat is positioned in the second position;
   a first pin, wherein when the connecting seat is located in the first position, the first pin is detachably inserted in the mounting rod and at least one of the two side plates so that the connecting seat is positioned in the first position and non-rotatable toward the second positions;
   wherein a stop member is inserted to the two side plates, the stop member is located at ends of the two side plates remote from the upper plate, and when the connecting seat is located in the second position, the stop member is abutted against a bottom of the mounting rod.

2. The carrier of claim 1, wherein the shaft is located between the inclined surface and the first pin, and when the connecting seat is located in the first position, an included angle between the inclined surface and the top of the mounting rod is equal to or less than 70 degrees.

3. The carrier of claim 1, wherein the upper plate includes an upright seat, the stand rod is rotatably connected to the upright seat, the carrier further includes a second pin, and the second pin is releasably inserted in the upright seat and the stand rod so that the stand rod is non-rotatable relative to the upright seat.

4. The carrier of claim 1, wherein two side seats are connected to opposing sides of the connecting seat, respectively; the two lateral rods are rotatably connected to the two side seats, respectively; a side of each of the two side seats includes two positioning holes, and each of the two lateral rods includes an elastic positioning member; when the elastic positioning member corresponds to and engages in one of the two positioning holes, the lateral rod is non-rotatable relative to the side seat.

5. The carrier of claim 4, wherein an upper portion of each of the two side seats adjacent to the connecting seat includes an upper blocking member, a lower portion of each of the two side seats remote from the connecting seat includes a lower blocking member, a position at which the side seat and the lateral rod are rotatably connected is located between the upper blocking member and the lower blocking member, and when each of the two lateral rods rotates downward, an end of each of the two lateral rods directed toward the connecting seat is abutted against the upper blocking member, and another end of each of the two lateral rods is abutted against the lower blocking member.

6. The carrier of claim 5, wherein the upper blocking member is a plate member, the lower blocking member is a pin member, a buffering member is disposed on an end of the lateral rod directed toward the connecting seat, and when the lateral rod rotates downward, the buffering member is abutted against the upper blocking member.

7. The carrier of claim 1, wherein an end of an elastic buckle member is rotatably connected to the first pin, the elastic buckle member extends cross the connecting seat, and another end of the elastic buckle member is sleeved on the first pin.

8. The carrier of claim 1, wherein each of opposing sides of the stand rod includes a retaining member, and each of the two lateral rods includes two carrying members each corresponding to one of the two retaining members.

9. The carrier of claim 2, wherein the upper plate includes an upright seat, the stand rod is rotatably connected to the upright seat, the carrier further includes a second pin, and the second pin is releasably inserted in the upright seat and the stand rod so that the stand rod is non-rotatable relative to the upright seat; two side seats are connected to opposing sides of the connecting seat, respectively; the two lateral rods are rotatably connected to the two side seats, respectively; a side of each of the two side seats includes two positioning holes, and each of the two lateral rods includes an elastic positioning member; when the elastic positioning member corresponds to and engages in one of the two positioning holes, the lateral rod is non-rotatable relative to the side seat; an upper portion of each of the two side seats adjacent to the connecting seat includes an upper blocking member, a lower portion of each of the two side seats remote from the connecting seat includes a lower blocking member, a position at which the side seat and the lateral rod are rotatably connected is located between the upper blocking member and the lower blocking member, and when each of the two lateral rods rotates downward, an end of each of the two lateral rods directed toward the connecting seat is abutted against the upper blocking member, and another end of each of the two lateral rods is abutted against the lower blocking member; the upper blocking member is a plate member, the lower blocking member is a pin member, a buffering member is disposed on an end of the lateral rod directed toward the connecting seat, and when the lateral rod rotates downward, the buffering member is abutted against the upper blocking member; an end of an elastic buckle member is rotatably connected to the first pin, the elastic buckle member extends cross the connecting seat, and another end of the elastic buckle member is sleeved on the first pin; each of opposing sides of the stand rod includes a retaining member, and each of the two lateral rods includes two carrying members each corresponding to one of the two retaining members.

\* \* \* \* \*